United States Patent [19]
Yoshida

[11] Patent Number: 5,727,086
[45] Date of Patent: Mar. 10, 1998

[54] DEVICE AND METHOD FOR PICTURE PROCESSING INCLUDING CONTRACTION OF TONED IMAGE

[75] Inventor: Masayasu Yoshida, Tokyo, Japan

[73] Assignee: NEC Corporation, Tokyo, Japan

[21] Appl. No.: 563,916

[22] Filed: Nov. 29, 1995

[30] Foreign Application Priority Data

Nov. 29, 1994 [JP] Japan ................... 6-294409

[51] Int. Cl.[6] ............. G06K 9/42; H04N 1/393; H04N 1/40; H04N 1/46
[52] U.S. Cl. ............ 382/232; 382/298; 382/299; 358/451; 358/448; 358/528
[58] Field of Search ................ 358/451, 448, 358/528, 455, 525, 445; 382/298, 232, 299

[56] References Cited

U.S. PATENT DOCUMENTS 5,200,839  4/1993  Uchizono ................ 358/448
5,287,419  2/1994  Sato et al. ............... 358/455
5,299,028  3/1994  Kwarta ................... 358/445
5,400,154  3/1995  Takayama et al. ....... 358/525

FOREIGN PATENT DOCUMENTS 2107061  4/1990  Japan .

*Primary Examiner*—Edward L. Coles, Sr.
*Assistant Examiner*—Tia M. Harris
*Attorney, Agent, or Firm*—Whitham, Curtis, Whitham & McGinn

[57] ABSTRACT

An averaging circuit for sequentially calculating an average of an original pixel data and a delayed pixel data to output a correction data and a multiplexer for selecting one of the pixel data and the correction data cooperate with each other, under control of a timing generator for generating a control signal, to output a pixel data on a contracted picture with a reduced distortion, permitting use of a relatively small-scale circuit.

6 Claims, 6 Drawing Sheets

—— ORIGINAL SIGNAL

----- RESAMPLED ANALOG SIGNAL

—— ORIGINAL SIGNAL

------ RESAMPLED ANALOG SIGNAL

—— ORIGINAL SIGNAL

------ RESAMPLED ANALOG SIGNAL

DEVICE AND METHOD FOR PICTURE PROCESSING INCLUDING CONTRACTION OF TONED IMAGE

BACKGROUND OF THE INVENTION

The present invention generally relates to a device and a method for processing a picture as a set of image data, and particularly, to a device and a method for a picture processing including a contraction or reduction in size (hereafter collectively "contraction") of a toned image.

DESCRIPTION OF THE RELATED ART

Recent years have observed a rapid spread of pictorial communications as well as the mechanization of office work, accompanying an increasing need for techniques available for reproducing a high-quality picture including a toned image.

Such a reproduction is supported by a picture processor adaptive to a process for contracting a picture including a toned image.

As typical conventional techniques available for such a contraction process, there are three known methods: a first method that uses a linear approximation of a first degree; a second method that employs a simple sampling for thinning out a set of pixel data into a subset thereof; and a third method, as an improved modification of the second method, that performs an interpolation simply between those pixels neighboring a pixel to be omitted for a thinning.

The first conventional picture processing method using a first-degree approximation is illustrated in FIGS. 1 and 2, as it is applied to a toned image of an original picture to be contracted, while the toned image is represented as an analog image signal that extends in a scanning direction in the figures and has a voltage level representative of a tone thereof.

FIG. 1 shows a relationship between a sampling of the analog image signal (hereafter "original analog signal" or simply "original signal") for a quantization for a contraction of the original picture and a resampling for a reproduction thereof. FIG. 2 shows a processed signal in comparison with the original analog signal of FIG. 1.

The original signal is sampled at, e.g., eight sampling points A1 to A8 of time to have a sequence of voltage levels as original sample signals a1 to a8.

On a basis of these sample signals a1 to a8, an interpolation is performed to estimate voltage levels at, e.g., seven resampling points B1 to B7 of time, as resample signals b1 to b7 for a projection at time points smaller in number than the original sampling points A1 to A8.

More specifically, letting A(n) and a(n) be a sampling point "An" and an original signal "an" at the sampling point "An", respectively, where "n" is a continuously increasing integer, the first-degree approximation is calculated to determine an inclination between a pair of original sample signals a(n) and a(n+1) sampled at an arbitrary pair of neighboring sampling points A(n) and A(n+1), to be employed for an estimation of a voltage level as a resample signal b(m)= "bm" at a resampling point B(m)="Bm", where "m" is a continuously increasing integer.

The first conventional method provides a processed picture relatively faithful to an original picture with low distortion. It however has to solve a set of first-degree equations, having results of the first-degree approximation substituted as values for the resample signals, thus needing a multiplicity of calculation circuits as well as memory circuits, resulting in a relatively large scale of hardware.

The second conventional method employing a simple thinning-out sampling is illustrated in FIGS. 3A and 3B. FIG. 3A shows a relationship between a sampling and a resampling. FIG. 3B shows a processed signal in comparison with an original signal.

In the second method, as shown in FIG. 3A, voltage levels a(n) of an original signal are sequentially sampled at sampling points A(n), subject to, e.g., every fifth one a(5k) of them to be omitted for a thinning-out contraction, where "k" is an arbitrary integer, so that, among a sequence {a(n)} of the sampled signals a(n), a subsequence thereof {a(1), ..., a(4), a(6), ..., a(9), a(11), ..., a(5k−1), a(5k+1), ... } is resultantly sampled, as voltage levels a(5), a(10), ..., a(5k), ... sampled at sampling points A(5), A(10), ..., A(5k), ... are omitted.

The sample signals in the resultant sequence {a(1), ..., a(4), a(6), ..., a(9), a(11), ..., a(5k−1), a(5k+1), ... } are simply identified in order thereof to provide a sequence of resample signals {b(m)} such that {b(1), ..., b(4), b(5), ..., b(8), b(9), ..., b(4k), a(4k+1), ... }.

Then, as shown in FIG. 3B, the resample signals {b(m)} are projected to their voltage levels at their resampling points B(m) irrespective of the omitted sampling points A(5k).

Accordingly, the second conventional method permits a relatively small scale of hardware to be employed. It however tends to cause a significant deviation from an original signal, resulting in an irregular alignment of pixel barycenter and a remarkable distortion of a toned image.

For an improvement to such points, the third conventional method has been proposed in the Japanese Patent Application Laid-Open Publication No. 2-107061.

In this method, a pair of pixels neighboring a pixel (represented by a voltage level a(n)) to be omitted for a thinning have their original sample signals a(n−1) and a(n+1) simply employed for an interpolation therebetween, permitting a relatively small scale of hardware to be employed, effectively reducing a degree of image distortion.

The third conventional method is illustrated in FIGS. 4A and 4B. FIG. 4A shows a relationship between a sampling and a resampling. FIG. 4B shows a processed signal in comparison with an original signal.

In FIG. 4A, a total of 8k voltage levels a(n) of an original signal are sequentially sampled at sampling points A(n), including, e.g., every (8k−4)-th one such as a(4), every (8k−3)-th one such as a(5) and every (8k−2)-th one such as a(6) to be employed for an interpolation before their omission for a thinning for a contraction.

In the interpolation, an arbitrary pair of neighboring two of the sample signals to be omitted, e.g., a combination of sample signals a(8k−4) and a(8k−3) such as a(4) and a(5) or a combination of sample signals a(8k−3) and a(8k−2) such as a(5) and a(6), have their values arithmetically averaged to be, e.g., [a(8k−4)+a(8k−3)]/2 such as [a(4)+a(5)]/2 or [a(8k−3)+a(8k−2)]/2 such as [a(5)+a(6)]/2, to provide a number of thus interpolated values such as b(4) or b(5).

In a sequence {a(n)} of original sample signals a(n), those sample signals employed for the interpolation are replaced by the interpolated values, to thereby constitute a sequence {b(m)} of resample signals b(m).

In other words, letting $n_0$ and $m_0$ be a concerned "n" and a corresponding "m", respectively, a sample signal sequence $\{a(1), \ldots, a(n_0-1), a(n_0), a(n_0+1), \ldots, a(2n_0-1), a(2n_0), \ldots\}$ is converted into a contracted sequence $\{a(1), \ldots, [a(n_0-1)+a(n_0)]/2, [a(n_0)+a(n_0+1)]/2, \ldots, a(2n_0-1), \ldots\}$ by an interpolation, which is employed as a resample signal sequence {b(1), . . . . , b($m_0$−1), b($m_0$), b($m_0$+1), . . . . , b($2m_0$−1), . . . }.

Then, as shown in FIG. 4B, the resample signals {b(m)} are projected to their voltage levels at their resampling points B(m) like the case of FIG. 3B., permitting an improved alignment of the pixel barycenter, resulting in a reduced degree of distortion.

The third conventional method is applicable to a set of binary image data. Omitted pixel values are accumulated to be divided by a number thereof to provide an average value, which is output for a correction.

As described, the first conventional method has to solve a set of first-degree equations having results of a first-degree approximation substituted as values for resample signals, thus needing a multiplicity of calculation circuits as well as memory circuits, resulting in a relatively large scale of hardware.

The second conventional method tends to cause a significant deviation from an original signal, resulting in an irregular alignment of pixel barycenter and a remarkable distortion of a toned image.

The third conventional method, which is an improved modification of the second conventional method as described, needs a relatively large scale of hardware for dividing a sum of pixels values by such a number of sample signals to be omitted that is variable in dependence on a thinning ratio. Further, it simply employs an arithmetic average between a pair of neighboring sample signals for an interpolation, thus resulting in an insufficient accuracy.

The present invention has been achieved with such points in mind.

SUMMARY OF THE INVENTION

It therefore is an object of the present invention to provide a picture processing device and a picture processing method, permitting a relatively small scale of hardware to be employed for a picture contraction with an improved interpolation accuracy.

To achieve the object, the present invention provides a picture processing device for contracting an original picture in a pixel data thinning manner to provide a contracted picture by omitting, from a sequence of pixel data representative of the original picture, a respective pixel data appearing therein at an interval of a predetermined number of pixel data. One embodiment of the invention is a picture processing device including a correction data generator for generating a correction data for correcting a distortion of the contracted picture from a number of pixel data in a vicinity of the respective pixel data in the sequence of pixel data. The correction data generator further includes; an average calculator for sequentially calculating an average between a first pixel data appearing at a first place in the sequence of pixel data and a second pixel data appearing at a second place neighboring the first place in the sequence of pixel data to provide an averaged data as a candidate for the correction data includes a data selector for responding to a control signal to select one of the averaged data and a pixel data in the sequence of pixel data and output a combination of the selected data and the correction data, and a control signal generator for generating the control signal in a predetermined timing.

According to the invention, an average calculator for generating a data representing an average between a pair of neighboring data is cooperative with a data selector for selecting one of the data representing the average and an original pixel data to serve for providing a data for an interpolation and a data on a contraction ratio in an independent manner relative to each other, thus permitting a use of a fixed division factor, which leads to a reduced scale of hardware.

Moreover, the provision of an interpolation-oriented data independent from a pixel data omittable for a thinning contraction permits an optimal interpolation selected for the contraction, resulting in an improved correction accuracy.

According to a further embodiment of the invention, the average calculator includes a latch for responding to a supplied clock to temporarily hold the first pixel data and output the second pixel data, an adder for adding the first and second pixel data to provide an added data, and a half divider for dividing the added data to a half thereof.

According to another embodiment of the invention, the average calculator includes a latch for responding to a supplied clock to temporarily hold the first pixel data and output the second pixel data, and has a first, a second, a third and a fourth data selector for responding to a first and a second mode signals supplied thereto to selectively switch the first and the second data to each other to provide a first, a second, a third and a fourth selected data, respectively. This embodiment further includes a first adder for adding the first and the second selected data to provide a first added data, a second adder for adding the third and the fourth selected data to provide a second added data, a third adder for adding the first and the second added data to provide a third added data, and a one-fourth divider for dividing the third added data to a one-fourth thereof.

According to the above embodiment of the invention, the one-fourth divider can include a shifter for shifting the third added data by two bits to provide the one-fourth thereof.

Moreover, to achieve the object, still another embodiment of the present invention provides a picture processing method for contracting an original picture in a pixel data thinning manner to provide a contracted picture by omitting, from a sequence of pixel data representative of the original picture, a respective pixel data appearing therein at an interval of a predetermined number of pixel data. The picture processing method of this embodiment includes the steps of generating a correction data for correcting a distortion of the contracted picture from a number of pixel data in a vicinity of the respective pixel data in the sequence of pixel data, the step of generating the correction data including sequentially calculating an average between a first pixel data appearing at a first place in the sequence of pixel data and a second pixel data appearing at a second place neighboring the first place in the sequence of pixel data to provide an averaged data as a candidate for the correction data, and responding to a control signal to select one of the averaged data and a pixel data in the sequence of pixel data and output a combination of the selected data and the correction data. In this embodiment the generating of the control signal in a predetermined timing.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
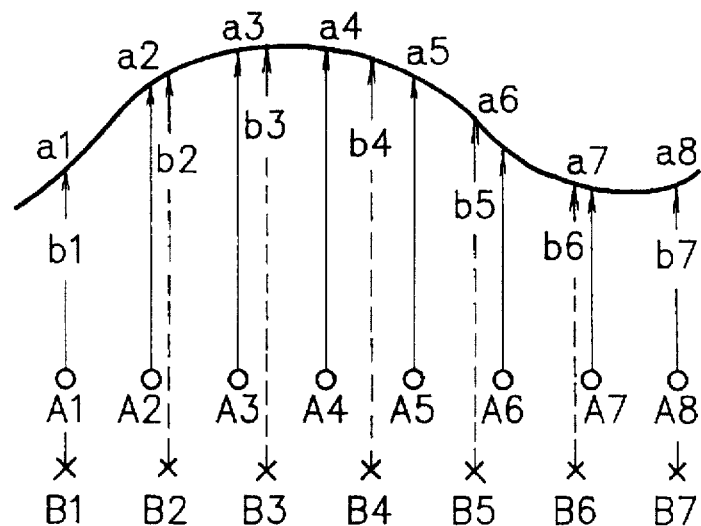
FIG. 1 is a time chart showing a relationship between a sampling of an original signal for a quantization for a contraction of an original picture and a resampling for a reproduction thereof, in accordance with a conventional picture processing method.
Figure 2:
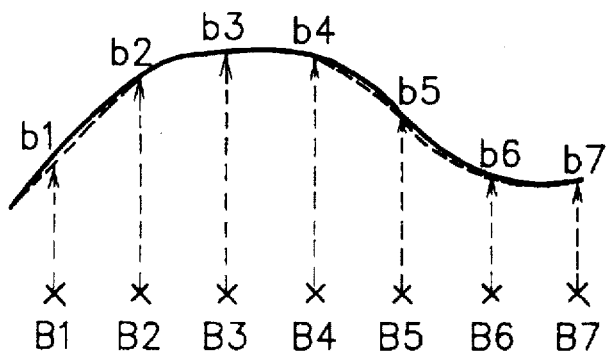
FIG. 2 is a time chart showing a processed signal in comparison with the original signal of FIG. 1.
Figure 3A:
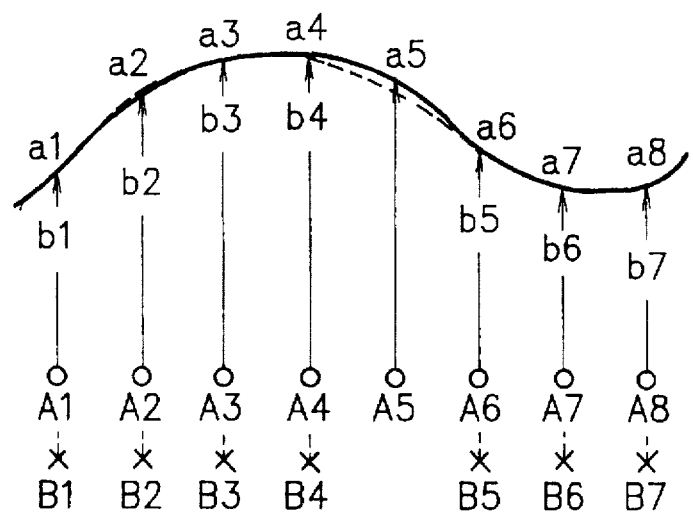
FIG. 3A is a time chart showing a relationship between a simple thinning-out sampling of an original signal and a resampling for a reproduction, in accordance with another conventional picture processing method.
Figure 3B:
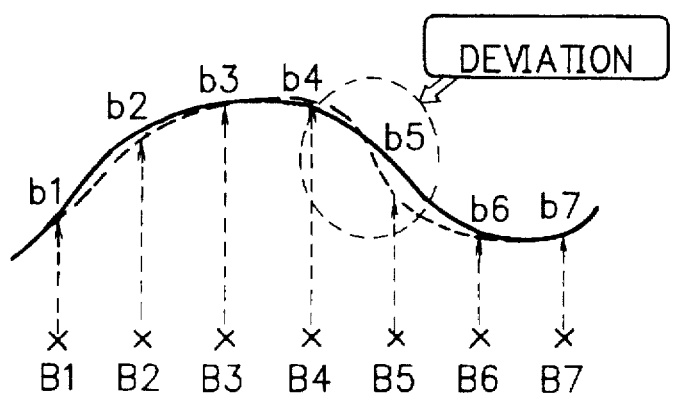
FIG. 3B is a time chart showing a processed signal in comparison with the original signal of FIG. 3A.
Figure 4A:
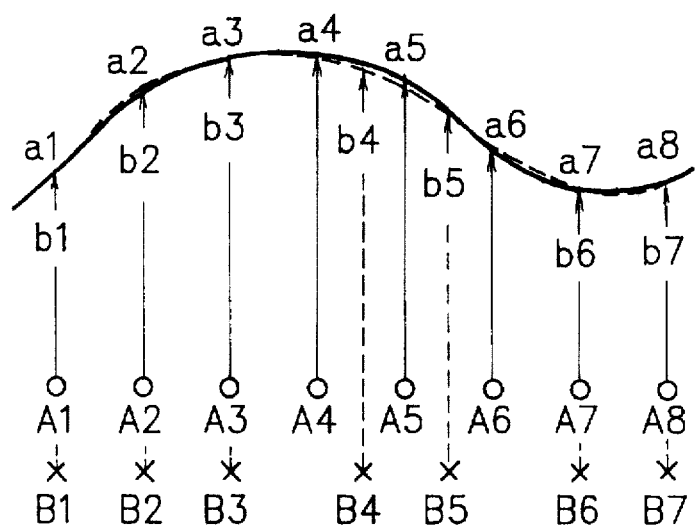
FIG. 4A is a time chart showing a relationship between a thinning-out sampling of an original signal, as it is combined with an interpolation, and a resampling for a reproduction, in accordance with still another conventional picture processing method.
Figure 4B:
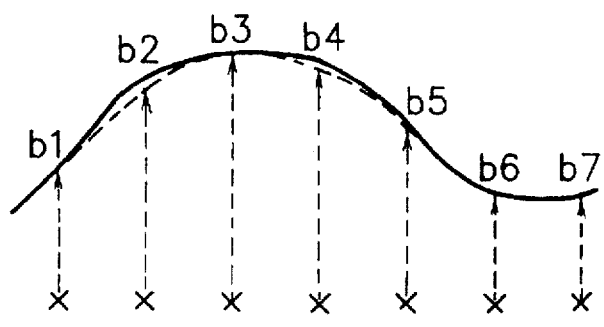
FIG. 4B is a time chart showing a processed signal in comparison with the original signal of FIG. 4A.

There will be detailed below preferred embodiments of the present invention, with reference to FIGS. 5 to 6. Like members are designated by like reference characters.

Figure 5:
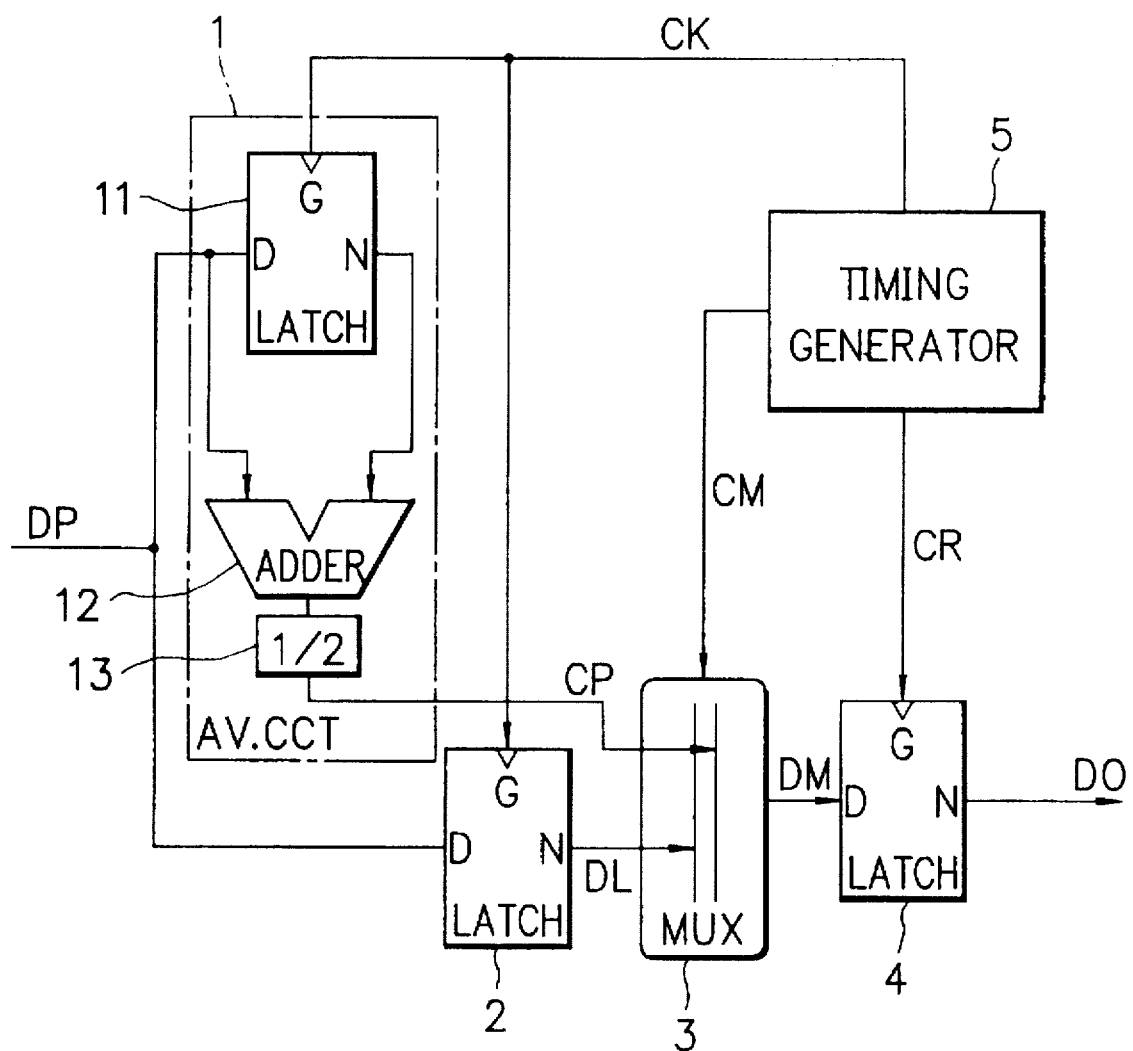
FIG. 5 is a block diagram of a picture processing device according to an embodiment of the invention.
Figure 6:
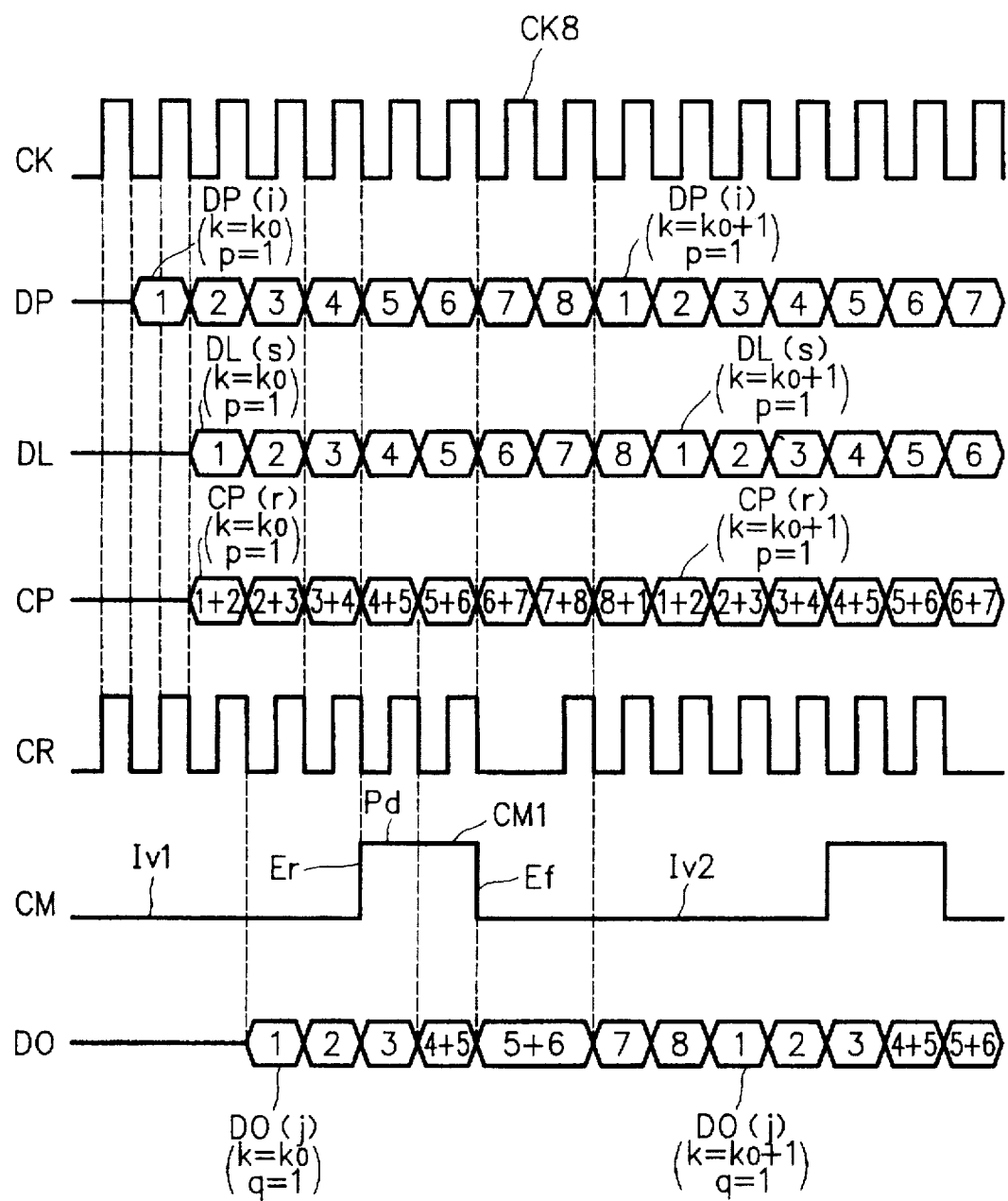
FIG. 6 is a time chart showing various signals associated with circuit actions of the picture processing device of FIG. 5.

FIG. 5 shows a picture processing device according to an embodiment of the invention. FIG. 6 shows datastreams, clock signals and a control signal associated with circuit actions of the picture processing device of FIG. 5. Data in the datastreams will be numbered in the order of their occurrence.

The picture processing device of FIG. 5 receives from an unshown video data source a sequence $\{DP(i)\}$ of multi-value pixel data $DP(i)$ (hereafter sometimes collectively "DP") representative of toned images constituting an original picture, for processing the same to contract the original picture in a pixel data thinning manner to provide a sequence $\{D0(j)\}$ of data $D0(j)$ (hereafter sometimes collectively "D0") representative of toned images constituting a contracted picture which is output, for example to an unshown quantitizer, where "i" and "j" are arbitrary integers such that $i=8k+p$ and $j=7k+q$, respectively, where "k" is a continuously increasing integer such that $0 \leq k$, and "p" and "q" are continuously increasing integers such that $1 \leq p \leq 8$ and $1 \leq q \leq 7$, respectively. In FIG. 6, each data is represented by a pair of positive and negative logical levels thereof characterized simply by an associated "p" or a combination of associated "p"s.

The picture processing device comprises: an averaging circuit 1 that receives the pixel data DP and a sampling clock signal CK consisting of a sequence of clock pulses and outputs a sequence $\{CP(r)\}$ of data $CP(r)$ for interpolation (hereafter sometimes collectively "CP"), where "r" is an arbitrary integer such that $r=8k+p$; a latch circuit 2 that receives the pixel data DP and the sampling clock signal CK and outputs a sequence $\{DL(s)\}$ of delayed pixel data $DL(s)$ (hereafter sometimes collectively "DL"), where "s" is an arbitrary integer such that $s=8k+p$; a multiplexer 3 that receives the interpolation data CP, the delayed pixel data DL and a control signal CM consisting of a sequence of control pulses and outputs a sequence of selected data DM; another latch circuit 4 that receives the selected data DM and a resampling clock signal CR consisting of a sequence of thinned-out clock pulses and provides the output data DO; and a timing generator 5 that generates to supply the sampling clock signal CK, the resampling clock signal CR and the control signal CM.

To facilitate a comprehension, letting "$_0$" be a suffix denoting a concerned integer, a concerned value $k_0$ of "k" is now assumed to be 0. Accordingly, in FIG. 6, CP(r=1) and DL(s=1) appear in synchronism with DP(i=2), and DO(j=1) appears in synchronism with CP(r=2), DL(s=2) and DP(i=3), as will be seen from the description below.

The averaging circuit 1 serves as a calculator for sequentially calculating an average $[DP(i_0-1)+DP(i_0)]/2$ between a pair of pixel data $DP(i_0-1)$ and $DP(i_0)$ neighboring each other before a resampling, to thereby generate an interpolation data $CP(r=i_0-1)$ so that $CP(r=p_0-1)=[DP(i=p_0-1)+DP(i=p_0)]/2$, such as $CP(r=2-1=1)=[DP(i=1)+DP(i=2)]/2$ and $CP(r=8)=[DP(i=8)+DP(i=9)]/2=\{DP(i=8)+DP(I=8k+p; k=k_0+1, p=1)]/2$.

The averaging circuit 1 comprises a latch circuit 11 for responding to the sampling clock signal CK to output a previous pixel data $DP(i_0-1)$ which has been latched therein till then and latch a current pixel data $DP(i_0)$, an adder 12 for adding the previous and current pixel data $DP(i_0-1)$ and $DP(i_0)$ to provide an arithmetic sum $DP(i_0-1)+DP(i_0)$ of them, and a half divider 13 for dividing the sum $DP(i_0-1)+DP(i_0)$ to a half $[DP(i_0-1)+DP(i_0)]/2$, which is output as the interpolation data $CP(r=i_0-1)$. The divider 13 may comprise a shifter for shifting an output of the adder 12 by a single bit.

The latch circuit 2 responds to the sampling clock signal CK to output a previous pixel data $DP(i_0-1)$ which has been latched therein till then and latch a current pixel data $DP(i_0)$, so that the previous pixel data $DP(i_0-1)$ is output as the delayed pixel data $DL(s=i_0-1)$.

The multiplexer 3 selects one of the interpolation data $CP(r=i_0-1)$ and the delayed pixel data $DL(s=i_0-1)$, so that either of them is output as the selected data DM. The data to be selected is alternately changed in response to pulse edges of the control signal CM supplied to the multiplexer 3. For example, in FIG. 6, the delayed pixel data $DL(s)$ is selected during a first interval Iv1 absent a CM pulse until a rising edge Er of a first control pulse CM1 comes, as well as a second interval Iv2 after a falling edge Ef of the control pulse CM1 has come. In contrast, the interpolation data CP(r) is selected during a pulse duration Pd between the rising and falling edges Er and Ef of the control pulse CM1. Accordingly, the selected data DM comprises the pixel data $DL(s=i_0-1)$ in the interval Iv1, the interpolation data $CP(r=i_0-1)$ in the duration Pd and again the pixel data $DL(s=i_0-1)$ in the interval Iv2.

The latch circuit 4 responds to the resampling clock signal CR to output a previous selected data DM $[DL(s=i_0-2)$ or $CP(r=i_0-2)]$ which has been latched therein till then and latch a current selected data DM $[DP(s=i_0-1)$ or $CP(r=i_0-1)]$, so that the output data $DO(j=i_0-2)$ comprises the previous selected data DM $[DL(s=i_0-2)$ or $CP(r=i_0-2)]$ so long as the resampling clock signal CR is kept synchronous to the sampling clock signal CK. In FIG. 6, however, a resampling clock pulse corresponding to an eighth sampling clock pulse CK8 is omitted. Therefore, the output data DOs for j=1 to 3 are identical to the delayed pixel data DL(s=1~3), but DOs for j=4 and 5 are identical to the interpolation data CP(r=4, 5). Accordingly, the two output data DOs at j=4 and 5 are interpolated from three invalidated pixel data, at i=4, 5, and 6 whereby the sequence of pixel data DP is thinned out.

Figure 7:
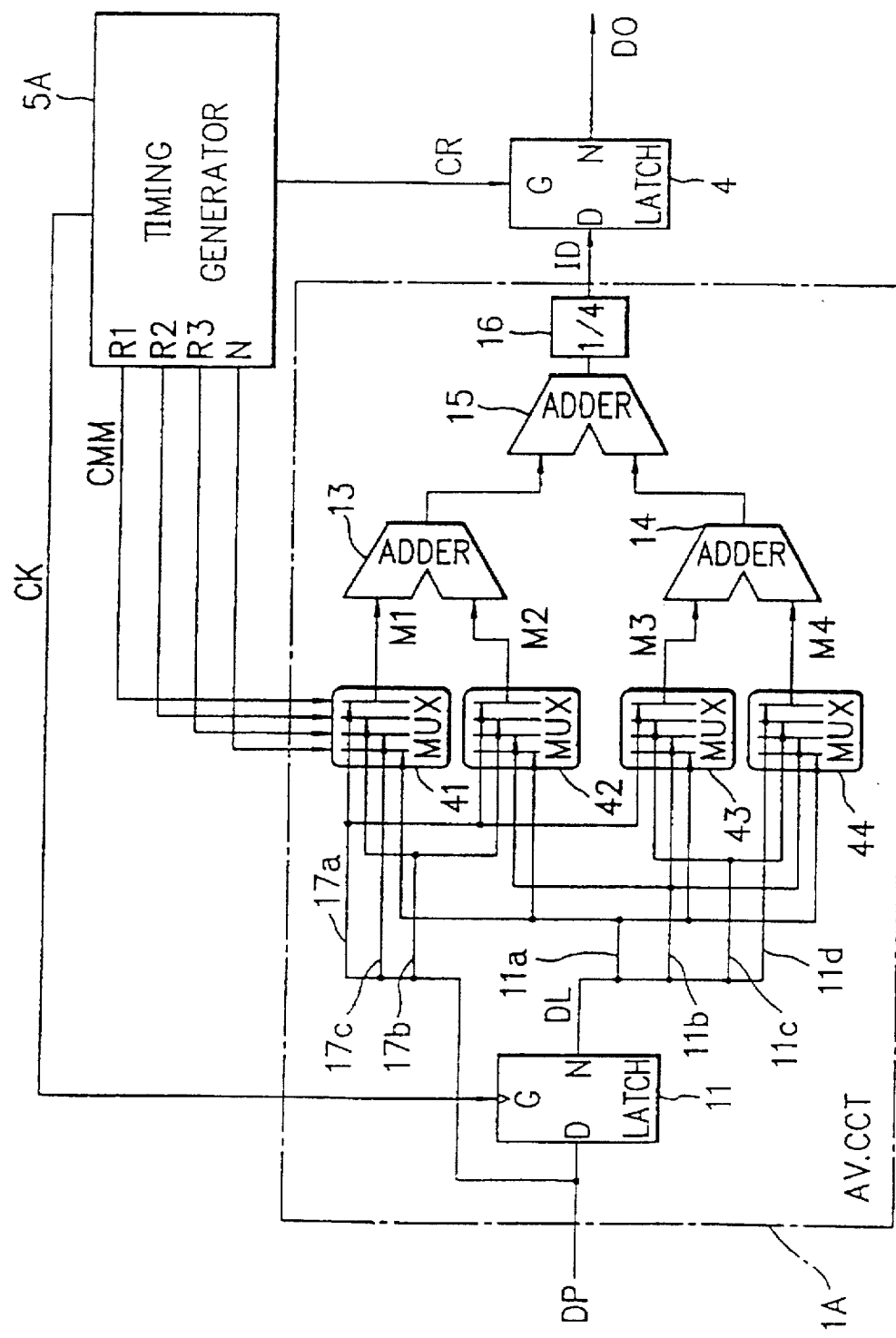
FIG. 7 is a block diagram of a picture processing device according to another embodiment of the invention.

FIG. 7 shows a picture processing device according to another embodiment of the invention.

The picture processing device of FIG. 7 comprises an averaging circuit 1A that receives from an unshown video data source a sequence of pixel data DP representative of an original picture, a sampling clock signal CK and four control signals CMM and outputs a sequence of interpolation data ID, a latch circuit 4 that receives the interpolation data ID and a resampling clock signal CR and provides a sequence of data DO to be output, and a timing generator 5A that generates to supply the sampling clock signal CK, the control signals CMM and the resampling clock signal CR.

The averaging circuit 1A comprises a latch circuit 11 for delaying the pixel data DP to provide a sequence of delayed pixel data DL, two pairs of 4-input, 1-output multiplexers 41, 42 and 43, 44 connected to the video data source and/or the latch circuit 11 as shown in the figure, a first adder 13 connected at input terminals thererof to one pair of multiplexers 41 and 42, a second adder 14 connected at input terminals thererof to the other pair of multiplexers 43 and 44, a third adder 15 connected at input terminals thererof to output terminals of the first and second adders 13 and 14, and a ¼ divider 16 connected at an input terminal thereof to an output terminal of the third adder 15 and at an output terminal thereof to the latch circuit 4. The ¼ divider 16 divides an output of the adder 15 into a ¼. The divider 16 may comprise a shifter for shifting an output of the adder 15 by two bits.

The control signals CMM designate four control modes, i.e. three resampling modes R1, R2 and R3 and a normal mode N, to thereby switching over the interpolation data ID among a number of signal status thereof including a normal status representative of an arithmetic average between a pixel data to be omitted and a neighboring pixel data and a pair of biased status representative of a weighted average therebetween by a weighting proportion of 1:3.

Description will be made of functions of the picture processing device of FIG. 7.

The latch circuit 11 responds to a clock pulse of the sampling clock signal CK to latch therein an original pixel data Dp, which is output therefrom as the delayed pixel data DL in response to a subsequent pulse of the clock signal CK.

The delayed pixel data DL is supplied through branching circuitry to input terminals of the multiplexers 41–44, i.e., through a branch 11a to an input terminal of each of the four multiplexers 41–44, through a branch 11b to an input terminal of each of three multiplexers 42–44, through a branch 11c to an input terminal of each of two multiplexers 43–44, and through a branch 11d to an input terminal of multiplexer 44.

Concurrently therewith, the original pixel data DP is supplied through branching circuitry to input terminals of the multiplexers 41–43, i.e., through a branch 17a to an input terminal of each of the three multiplexers 41–43, through a branch 17b to an input terminal of each of two multiplexers 41–42, and through a branch 17c to an input terminal of multiplexer 41.

The four input terminals of each of the multiplexers 41–44 are selectively connected to an output terminal thereof in accordance with a combination of the normal and resampling modes N and R1–R3, as they are designated by the control signals CMM supplied from the timing generator 5A, to provide an output data M1–M4 as a corresponding combination of the pixel data DP and DL, as shown in Table 1, to be input to either of the first and second adders 13 and 14.

TABLE 1

| MUX output | Control Modes | | | |
|---|---|---|---|---|
| | N | R1 | R2 | R3 |
| M1 | DL | DP | DP | DL |
| M2 | DL | DL | DP | DP |
| M3 | DL | DL | DL | DP |
| M4 | DL | DL | DL | DL |

The averaging circuit 1A calculates to output as the interpolation data ID an averaged data of four outputs M1–M4 of the multiplexers 41–44 in each control mode.

As shown in Table 2, the interpolation data ID comprises the pixel data DL in the normal mode N, and a data representative a weighted average between DL and DP by a weighting proportion of 1:3, 1:1 or 3:1 in the resampling mode R1, R2 or R3, respectively.

TABLE 2

| Mode | Averaged Data |
|---|---|
| N | DL |
| R1 | (DP + 3 × DL)/4 |
| R2 | (DP + DL)/2 |
| R3 | (3 × DP + DL)/4 |

Accordingly, an adaptive mode selection by the control signals CMM permits a picture contraction to be effected by an appropriate interpolation data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A picture processing device for contracting an original picture in a pixel data thinning manner to provide a contracted picture by omitting, from a sequence of multi-toned pixel data representative of the original picture, a respective pixel data appearing therein at an interval of a predetermined number of pixel data, the picture processing device comprising:

a control signal generation means for generating a control signal in a predetermined timing associated with the respective omitted pixel data; and a correction data generation means for generating a correction data for correcting a distortion of the contracted picture from a number of pixel data in a vicinity of omitted respective pixel data in said sequence of the pixel data, the correction data generation means including:

an averaging means for sequentially calculating an average between a first pixel data appearing at a first place in the sequence of pixel data and a second pixel data appearing at a second place neighboring the first place in the sequence of pixel data to provide an averaged data as a candidate data, and a data selection means for selecting one of the averaged data and a pixel data in the sequence of pixel data, in accordance with said control signal, and outputting a combination of the selected averaged data and pixel data as the correction data.

2. A picture processing device according to claim 1, wherein the averaging means comprises:

a latch means for responding to a supplied clock to temporarily hold the first pixel data and output the second pixel data;

an adder means for adding the first and second pixel data to provide an added data; and a half divider means for dividing the added data to a half thereof.

3. A picture processing device for contracting an original picture in a pixel data thinning manner to provide a contracted picture by omitting, from a sequence of multi-toned pixel data representative of the original picture, a respective pixel data appearing therein at an interval of a predetermined number of pixel data, the picture processing device comprising:

a control signal generation means for generating a control signal in a predetermined timing, said control signal means having means for generating a mode selection signal;

a correction data generation means for generating a correction data for correcting a distortion of the contracted picture from a number of pixel data in a vicinity of the respective pixel data in the sequence of the pixel data, the correction data generation means including:

an averaging means for dequentially calculating an average between a first pixel data appearing at a first place in the sequence of pixel data and a second pixel data appearing at a second place neighboring the first place in the sequence of pixel data to provide an averaged data as a candidate data, and a data selection means for selecting one of the averaged data and a pixel data in the sequence of pixel data, in accordance with said control signal, and outputting a combination of the selected averaged data and pixel data as the correction data, wherein the averaging means comprises:

a latch means for receiving a supplied clock and a sequential input of the first pixel data and the second pixel data and concurrently outputting the first pixel data and the second pixel data;

a first, second, a third and a fourth data selection means, each for receiving said first and second pixel data and said mode selection signal supplied thereto and, in accordance with said mode selection signal, and each for selectively switching between the first and the second pixel data and outputting a first, second, a third and a fourth selected data, respectively;

a first adder means for adding the first and the second selected data to provide a first added data;

a second adder means for adding the third and the fourth selected data to provide a second added data;

a third adder means for adding the first and the second added data to provide a third added data; and a one-fourth divider means for dividing the third added data to a one-fourth thereof.

4. A picture processing device according to claim 3, wherein the one-fourth divider means comprises a shifter for shifting the third added data by two bits to provide the one-fourth thereof.

5. A picture processing method for contracting an original picture in a pixel data thinning manner to provide a contracted picture by omitting, from a sequence of pixel data multi-toned to be representative of the original picture, a respective pixel data appearing therein at an interval of a predetermined number of pixel data, the picture processing method comprising the steps of:

generating a correction data for correcting a distortion of the contracted picture from a number of pixel data in a vicinity of the respective pixel data in the sequence of pixel data, the step of generating the correction data including:

sequentially calculating an average between a first pixel data appearing at a first place in the sequence of pixel data and a second pixel data appearing at a second place neighboring the first place in the sequence of pixel data to provide an averaged data as a candidate for the correction data, and responding to a control signal to select one of the averaged data and a pixel data in the sequence of pixel data and output a combination of the selected data and the correction data; and generating the control signal in a predetermined timing.

6. A picture processing device according to claim 1, wherein the second place neighboring the first place is immediately adjacent to said first place.

* * * * *